United States Patent
Morris et al.

(10) Patent No.: US 9,618,026 B2
(45) Date of Patent: *Apr. 11, 2017

(54) SEMI-CIRCULAR ALIGNMENT FEATURES OF AN ELASTIC AVERAGING ALIGNMENT SYSTEM

(75) Inventors: Steven E. Morris, Fair Haven, MI (US); Thomas F. Bowles, Grosse Pointe Farms, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1269 days.

This patent is subject to a terminal disclaimer.

(21) Appl. No.: 13/567,580

(22) Filed: Aug. 6, 2012

(65) Prior Publication Data

US 2014/0033493 A1 Feb. 6, 2014

(51) Int. Cl.
*B25G 3/00* (2006.01)
*F16C 11/06* (2006.01)
*F16B 17/00* (2006.01)
*B23P 19/10* (2006.01)

(52) U.S. Cl.
CPC .............. *F16B 17/00* (2013.01); *B23P 19/10* (2013.01); *Y10T 29/49778* (2015.01); *Y10T 403/20* (2015.01)

(58) Field of Classification Search
CPC ........ F16B 17/00; F16B 4/004; F16B 5/0056; F16B 5/0088; F16B 5/07; F16B 5/126; B23P 19/10; B25G 3/00
USPC ............. 403/13, 14, 27, 333, 334, 345, 361; 29/450, 525, 5, 897.2
See application file for complete search history.

(56) References Cited

U.S. PATENT DOCUMENTS

| | | | |
|---|---|---|---|
| 1,219,398 A | 3/1917 | Huntsman |
| 1,261,036 A | 4/1918 | Kerns |
| 1,301,302 A | 4/1919 | Nolan |
| 1,556,233 A | 10/1925 | Maise |
| 1,819,126 A | 8/1931 | Scheibe |
| 1,929,848 A | 10/1933 | Neely |
| 1,968,168 A | 7/1934 | Place |

(Continued)

FOREIGN PATENT DOCUMENTS

| BE | 842302 A | 9/1976 |
|---|---|---|
| CN | 1036250 A | 10/1989 |

(Continued)

OTHER PUBLICATIONS

U.S. Appl. No. 13/187,675, filed Jul. 21, 2011, titled "Elastic Tube Alignment System for Precisely Locating Components"—Inventor: Steven E. Morris.

(Continued)

*Primary Examiner* — Gregory Binda
*Assistant Examiner* — Nahid Amiri
(74) *Attorney, Agent, or Firm* — Cantor Colburn LLP

(57) ABSTRACT

A semi-circular male alignment feature elastic averaging alignment system utilizing a plurality of semi-circular male alignment features which interface by elastic averaging with a plurality of female alignment features, wherein semi-circular male alignment features of a first component are received during a mating process by respective female alignment features formed in a second component, whereby precise alignment of the first and second components and stiffness are provided by elastic averaging of the male and female alignment features.

7 Claims, 8 Drawing Sheets

(56) References Cited

U.S. PATENT DOCUMENTS

| | | | |
|---|---|---|---|
| 1,982,076 A | 11/1934 | Spann | |
| 1,999,990 A | 4/1935 | Carr | |
| 2,006,525 A | 7/1935 | Thal | |
| 2,267,558 A | 12/1941 | Birger et al. | |
| 2,275,103 A | 3/1942 | Gooch et al. | |
| 2,275,900 A | 3/1942 | Hall | |
| 2,385,180 A | 9/1945 | Allen | |
| 2,482,488 A | 9/1949 | Franc | |
| 2,560,530 A | 7/1951 | Burdick | |
| 2,612,139 A | 9/1952 | Collins | |
| 2,688,894 A | 9/1954 | Modrey | |
| 2,693,014 A | 11/1954 | Monahan | |
| 2,707,607 A | 5/1955 | O'Connor | |
| 2,778,399 A | 1/1957 | Mroz | |
| 2,780,128 A | 2/1957 | Rapata | |
| 2,788,046 A * | 4/1957 | Rosan | 411/311 |
| 2,862,040 A | 11/1958 | Curran | |
| 2,902,902 A | 9/1959 | Slone | |
| 2,940,149 A * | 6/1960 | O'Connor | 24/585.1 |
| 2,946,612 A | 7/1960 | Ahlgren | |
| 2,958,230 A | 11/1960 | Haroldson | |
| 3,005,282 A | 10/1961 | Christiansen | |
| 3,014,563 A | 12/1961 | Bratton | |
| 3,087,352 A | 4/1963 | Daniel | |
| 3,089,269 A | 5/1963 | McKiernan | |
| 3,130,512 A | 4/1964 | Van Buren, Jr. | |
| 3,152,376 A | 10/1964 | Boser | |
| 3,168,961 A | 2/1965 | Yates | |
| 3,169,004 A | 2/1965 | Rapata | |
| 3,169,439 A | 2/1965 | Rapata | |
| 3,188,731 A | 6/1965 | Sweeney | |
| 3,194,292 A | 7/1965 | Borowsky | |
| 3,213,189 A | 10/1965 | Mitchell et al. | |
| 3,230,592 A | 1/1966 | Hosea | |
| 3,233,358 A | 2/1966 | Dehm | |
| 3,233,503 A | 2/1966 | Birger | |
| 3,244,057 A | 4/1966 | Mathison | |
| 3,248,995 A | 5/1966 | Meyer | |
| 3,291,495 A | 12/1966 | Liebig | |
| 3,310,929 A | 3/1967 | Garvey | |
| 3,413,752 A | 12/1968 | Perry | |
| 3,473,283 A | 10/1969 | Meyer | |
| 3,531,850 A | 10/1970 | Durand | |
| 3,551,963 A | 1/1971 | Long | |
| 3,643,968 A | 2/1972 | Horvath | |
| 3,669,484 A | 6/1972 | Bernitz | |
| 3,680,272 A | 8/1972 | Meyer | |
| 3,733,655 A | 5/1973 | Kolibar | |
| 3,800,369 A | 4/1974 | Nikolits | |
| 3,841,044 A | 10/1974 | Brown | |
| 3,841,682 A | 10/1974 | Church | |
| 3,842,565 A | 10/1974 | Brown et al. | |
| 3,845,961 A | 11/1974 | Byrd, III | |
| 3,847,492 A | 11/1974 | Kennicutt et al. | |
| 3,860,209 A | 1/1975 | Strecker | |
| 3,868,804 A | 3/1975 | Tantlinger | |
| 3,895,408 A | 7/1975 | Leingang | |
| 3,897,967 A | 8/1975 | Barenyi | |
| 3,905,570 A | 9/1975 | Nieuwveld | |
| 3,972,550 A | 8/1976 | Boughton | |
| 3,988,808 A | 11/1976 | Poe et al. | |
| 4,035,874 A | 7/1977 | Liljendahl | |
| 4,039,215 A | 8/1977 | Minhinnick | |
| 4,042,307 A | 8/1977 | Jarvis | |
| 4,043,585 A | 8/1977 | Yamanaka | |
| 4,158,511 A | 6/1979 | Herbenar | |
| 4,169,297 A | 10/1979 | Weihrauch | |
| 4,193,588 A | 3/1980 | Doneaux | |
| 4,213,675 A | 7/1980 | Pilhall | |
| 4,237,573 A | 12/1980 | Weihrauch | |
| 4,267,680 A | 5/1981 | Delattre | |
| 4,300,851 A | 11/1981 | Thelander | |
| 4,313,609 A | 2/1982 | Clements | |
| 4,318,208 A | 3/1982 | Borja | |
| 4,325,574 A | 4/1982 | Umemoto et al. | |
| 4,358,166 A | 11/1982 | Antoine | |
| 4,363,839 A | 12/1982 | Watanabe et al. | |
| 4,364,150 A | 12/1982 | Remington | |
| 4,384,803 A | 5/1983 | Cachia | |
| 4,394,853 A | 7/1983 | Lopez-Crevillen et al. | |
| 4,406,033 A | 9/1983 | Chisholm et al. | |
| 4,407,413 A | 10/1983 | Jansson | |
| 4,477,142 A | 10/1984 | Cooper | |
| 4,481,160 A | 11/1984 | Bree | |
| 4,527,760 A | 7/1985 | Salacuse | |
| 4,575,060 A | 3/1986 | Kitagawa | |
| 4,591,203 A | 5/1986 | Furman | |
| 4,599,768 A | 7/1986 | Doyle et al. | |
| 4,605,575 A | 8/1986 | Auld et al. | |
| 4,616,951 A | 10/1986 | Maatela | |
| 4,648,649 A | 3/1987 | Beal | |
| 4,654,760 A | 3/1987 | Matheson et al. | |
| 4,672,732 A | 6/1987 | Ramspacher | |
| 4,745,656 A | 5/1988 | Revlett | |
| 4,757,655 A | 7/1988 | Nentoft | |
| 4,767,647 A | 8/1988 | Bree | |
| 4,805,272 A | 2/1989 | Yamaguchi | |
| 4,807,335 A | 2/1989 | Candea | |
| 4,817,999 A | 4/1989 | Drew | |
| 4,819,983 A | 4/1989 | Alexander et al. | |
| 4,843,975 A | 7/1989 | Welsch | |
| 4,843,976 A | 7/1989 | Pigott et al. | |
| 4,865,502 A | 9/1989 | Maresch | |
| 4,881,764 A | 11/1989 | Takahashi et al. | |
| 4,917,426 A | 4/1990 | Copp | |
| 4,973,212 A | 11/1990 | Jacobs | |
| 4,977,648 A | 12/1990 | Eckerud | |
| 5,005,265 A | 4/1991 | Muller | |
| 5,039,267 A | 8/1991 | Wollar | |
| 5,100,015 A | 3/1992 | Vanderstuyf | |
| 5,111,557 A | 5/1992 | Baum | |
| 5,139,285 A | 8/1992 | Lasinski | |
| 5,154,479 A | 10/1992 | Sautter, Jr. | |
| 5,165,749 A | 11/1992 | Sheppard | |
| 5,170,985 A | 12/1992 | Killworth et al. | |
| 5,180,219 A | 1/1993 | Geddie | |
| 5,208,507 A | 5/1993 | Jung | |
| 5,212,853 A | 5/1993 | Kaneko | |
| 5,234,122 A | 8/1993 | Cherng | |
| 5,250,001 A | 10/1993 | Hansen | |
| 5,297,322 A | 3/1994 | Kraus | |
| 5,309,663 A | 5/1994 | Shirley | |
| 5,333,965 A | 8/1994 | Mailey | |
| 5,339,491 A | 8/1994 | Sims | |
| 5,342,139 A | 8/1994 | Hoffman | |
| 5,348,356 A | 9/1994 | Moulton | |
| 5,368,427 A | 11/1994 | Pfaffinger | |
| 5,368,797 A | 11/1994 | Quentin et al. | |
| 5,397,206 A | 3/1995 | Sihon | |
| 5,407,310 A | 4/1995 | Kassouni | |
| 5,446,965 A | 9/1995 | Makridis | |
| 5,507,610 A | 4/1996 | Benedetti et al. | |
| 5,513,603 A | 5/1996 | Ang et al. | |
| 5,524,786 A | 6/1996 | Skudlarek | |
| 5,538,079 A | 7/1996 | Pawlick | |
| 5,556,808 A | 9/1996 | Williams et al. | |
| 5,566,840 A | 10/1996 | Waldner | |
| 5,575,601 A | 11/1996 | Skufca | |
| 5,577,301 A | 11/1996 | Demaagd | |
| 5,577,779 A | 11/1996 | Dangel | |
| 5,580,204 A | 12/1996 | Hultman | |
| 5,586,372 A | 12/1996 | Eguchi et al. | |
| 5,593,265 A | 1/1997 | Kizer | |
| 5,601,453 A | 2/1997 | Horchler | |
| 5,629,823 A | 5/1997 | Mizuta | |
| 5,634,757 A * | 6/1997 | Schanz | 411/535 |
| 5,657,516 A | 8/1997 | Berg et al. | |
| 5,667,271 A | 9/1997 | Booth | |
| 5,670,013 A | 9/1997 | Huang et al. | |
| 5,698,276 A | 12/1997 | Mirabitur | |
| 5,706,559 A | 1/1998 | Oliver | |
| 5,736,221 A | 4/1998 | Hardigg et al. | |
| 5,765,942 A | 6/1998 | Shirai et al. | |
| 5,775,860 A | 7/1998 | Meyer | |

(56) References Cited

U.S. PATENT DOCUMENTS

| | | |
|---|---|---|
| 5,795,118 A | 8/1998 | Osada et al. |
| 5,797,170 A | 8/1998 | Akeno |
| 5,797,714 A | 8/1998 | Oddenino |
| 5,803,646 A | 9/1998 | Weihrauch |
| 5,806,915 A | 9/1998 | Takabatake |
| 5,810,535 A | 9/1998 | Fleckenstein et al. |
| 5,820,292 A | 10/1998 | Fremstad |
| 5,920,200 A | 7/1999 | Pendse |
| 5,929,382 A | 7/1999 | Moore |
| 5,931,514 A | 8/1999 | Chung |
| 5,934,729 A | 8/1999 | Baack |
| 5,941,673 A | 8/1999 | Hayakawa et al. |
| 5,988,678 A | 11/1999 | Nakamura |
| 6,006,941 A | 12/1999 | Hitchings |
| 6,010,306 A | 1/2000 | Bucher |
| 6,073,315 A | 6/2000 | Rasmussen |
| 6,079,083 A | 6/2000 | Akashi |
| 6,095,594 A | 8/2000 | Riddle et al. |
| 6,103,987 A | 8/2000 | Nordquist |
| 6,109,882 A | 8/2000 | Popov |
| 6,152,436 A | 11/2000 | Sonderegger et al. |
| 6,164,603 A | 12/2000 | Kawai |
| 6,193,430 B1* | 2/2001 | Culpepper et al. ............ 403/13 |
| 6,199,248 B1 | 3/2001 | Akashi |
| 6,202,962 B1 | 3/2001 | Snyder |
| 6,209,175 B1 | 4/2001 | Gershenson |
| 6,209,178 B1 | 4/2001 | Wiese et al. |
| 6,254,304 B1 | 7/2001 | Takizawa et al. |
| 6,264,869 B1 | 7/2001 | Notarpietro et al. |
| 6,289,560 B1 | 9/2001 | Guyot |
| 6,299,478 B1 | 10/2001 | Jones et al. |
| 6,318,585 B1 | 11/2001 | Asagiri |
| 6,321,495 B1 | 11/2001 | Oami |
| 6,336,767 B1 | 1/2002 | Nordquist et al. |
| 6,345,420 B1 | 2/2002 | Nabeshima |
| 6,349,904 B1 | 2/2002 | Polad |
| 6,351,380 B1 | 2/2002 | Curlee |
| 6,354,815 B1 | 3/2002 | Svihla et al. |
| 6,378,931 B1 | 4/2002 | Kolluri et al. |
| 6,398,449 B1 | 6/2002 | Loh |
| 6,470,540 B2* | 10/2002 | Aamodt et al. ............... 24/452 |
| 6,484,370 B2 | 11/2002 | Kanie et al. |
| 6,485,241 B1 | 11/2002 | Oxford |
| 6,498,297 B2 | 12/2002 | Samhammer |
| 6,523,229 B2 | 2/2003 | Severson |
| 6,523,817 B1 | 2/2003 | Landry, Jr. |
| 6,533,391 B1 | 3/2003 | Pan |
| 6,543,979 B2 | 4/2003 | Iwatsuki |
| 6,557,260 B1 | 5/2003 | Morris |
| 6,568,701 B1 | 5/2003 | Burdack et al. |
| 6,579,397 B1 | 6/2003 | Spain et al. |
| 6,591,801 B1 | 7/2003 | Fonville |
| 6,609,717 B2 | 8/2003 | Hinson |
| 6,637,095 B2 | 10/2003 | Stumpf et al. |
| 6,658,698 B2 | 12/2003 | Chen |
| 6,662,411 B2 | 12/2003 | Rubenstein |
| 6,664,470 B2 | 12/2003 | Nagamoto |
| 6,668,424 B1 | 12/2003 | Allen |
| 6,677,065 B2 | 1/2004 | Blauer |
| 6,692,016 B2 | 2/2004 | Yokota |
| 6,712,329 B2 | 3/2004 | Ishigami et al. |
| 6,746,172 B2 | 6/2004 | Culpepper |
| 6,757,942 B2 | 7/2004 | Matsui |
| 6,799,758 B2 | 10/2004 | Fries |
| 6,840,969 B2 | 1/2005 | Kobayashi et al. |
| 6,857,676 B2 | 2/2005 | Kawaguchi et al. |
| 6,857,809 B2 | 2/2005 | Granata |
| 6,872,053 B2 | 3/2005 | Bucher |
| 6,908,117 B1 | 6/2005 | Pickett, Jr. et al. |
| 6,932,416 B2 | 8/2005 | Clauson |
| 6,948,753 B2 | 9/2005 | Yoshida et al. |
| 6,951,349 B2 | 10/2005 | Yokota |
| 6,957,939 B2* | 10/2005 | Wilson ..................... 411/431 |
| 6,959,954 B2 | 11/2005 | Brandt et al. |
| 6,966,601 B2 | 11/2005 | Matsumoto et al. |
| 6,971,831 B2* | 12/2005 | Fattori et al. ................ 411/508 |
| 6,997,487 B2 | 2/2006 | Kitzis |
| 7,000,941 B2 | 2/2006 | Yokota |
| 7,008,003 B1 | 3/2006 | Hirose et al. |
| 7,014,094 B2 | 3/2006 | Alcoe |
| 7,017,239 B2 | 3/2006 | Kurily et al. |
| 7,036,779 B2 | 5/2006 | Kawaguchi et al. |
| 7,055,785 B1 | 6/2006 | Diggle, III |
| 7,055,849 B2 | 6/2006 | Yokota |
| 7,059,628 B2 | 6/2006 | Yokota |
| 7,073,260 B2 | 7/2006 | Jensen |
| 7,089,998 B2 | 8/2006 | Crook |
| 7,097,198 B2 | 8/2006 | Yokota |
| 7,121,611 B2 | 10/2006 | Hirotani et al. |
| 7,144,183 B2 | 12/2006 | Lian et al. |
| 7,172,210 B2 | 2/2007 | Yokota |
| 7,178,855 B2 | 2/2007 | Catron et al. |
| 7,198,315 B2 | 4/2007 | Cass et al. |
| 7,207,758 B2 | 4/2007 | Leon et al. |
| 7,234,852 B2 | 6/2007 | Nishizawa et al. |
| 7,275,296 B2 | 10/2007 | DiCesare |
| 7,306,418 B2 | 12/2007 | Kornblum |
| 7,322,500 B2 | 1/2008 | Maierholzner |
| 7,344,056 B2 | 3/2008 | Shelmon et al. |
| 7,360,964 B2 | 4/2008 | Tsuya |
| 7,369,408 B2 | 5/2008 | Chang |
| 7,435,031 B2 | 10/2008 | Granata |
| 7,454,105 B2 | 11/2008 | Yi |
| 7,487,884 B2 | 2/2009 | Kim |
| 7,493,716 B2 | 2/2009 | Brown et al. |
| 7,500,440 B2 | 3/2009 | Chiu |
| 7,547,061 B2 | 6/2009 | Horimatsu |
| 7,557,051 B2 | 7/2009 | Ryu et al. |
| 7,568,316 B2 | 8/2009 | Choby et al. |
| 7,591,573 B2 | 9/2009 | Maliar et al. |
| D602,349 S | 10/2009 | Andersson |
| 7,614,836 B2 | 11/2009 | Mohiuddin |
| 7,672,126 B2 | 3/2010 | Yeh |
| 7,677,650 B2 | 3/2010 | Huttenlocher |
| 7,727,667 B2 | 6/2010 | Sakurai |
| 7,764,853 B2 | 7/2010 | Yi et al. |
| 7,793,998 B2 | 9/2010 | Matsui et al. |
| 7,802,831 B2 | 9/2010 | Isayama et al. |
| 7,803,015 B2 | 9/2010 | Pham |
| 7,828,372 B2 | 11/2010 | Ellison |
| 7,832,693 B2 | 11/2010 | Moerke et al. |
| 7,862,272 B2 | 1/2011 | Nakajima |
| 7,869,003 B2 | 1/2011 | Van Doren et al. |
| 7,883,137 B2 | 2/2011 | Bar |
| 7,891,926 B2 | 2/2011 | Jackson, Jr. |
| 7,922,415 B2 | 4/2011 | Rudduck et al. |
| 7,946,684 B2 | 5/2011 | Drury et al. |
| 8,029,222 B2 | 10/2011 | Nitsche |
| 8,061,861 B2 | 11/2011 | Paxton et al. |
| 8,101,264 B2 | 1/2012 | Pace et al. |
| 8,136,819 B2 | 3/2012 | Yoshitsune et al. |
| 8,162,375 B2 | 4/2012 | Gurtatowski et al. |
| 8,203,496 B2 | 6/2012 | Miller et al. |
| 8,203,843 B2 | 6/2012 | Chen |
| 8,206,029 B2 | 6/2012 | Vaucher et al. |
| 8,228,640 B2 | 7/2012 | Woodhead et al. |
| 8,249,679 B2 | 8/2012 | Cui |
| 8,261,581 B2 | 9/2012 | Cerruti et al. |
| 8,263,889 B2* | 9/2012 | Takahashi et al. ........... 200/512 |
| 8,276,961 B2 | 10/2012 | Kwolek |
| 8,291,553 B2 | 10/2012 | Moberg |
| 8,297,137 B2 | 10/2012 | Dole |
| 8,297,661 B2 | 10/2012 | Proulx et al. |
| 8,312,887 B2 | 11/2012 | Dunn et al. |
| 8,371,788 B2 | 2/2013 | Lange |
| 8,414,048 B1 | 4/2013 | Kwolek |
| 8,424,173 B2 | 4/2013 | Shiba |
| 8,444,199 B2 | 5/2013 | Takeuchi et al. |
| 8,474,214 B2 | 7/2013 | Dawe et al. |
| 8,480,186 B2 | 7/2013 | Wang |
| 8,511,707 B2 | 8/2013 | Amamori |
| 8,572,818 B2 | 11/2013 | Hofmann |
| 8,579,141 B2 | 11/2013 | Tejima |
| 8,619,504 B2 | 12/2013 | Wyssbrod |

(56) References Cited

U.S. PATENT DOCUMENTS

| | | |
|---|---|---|
| 8,677,573 B2 | 3/2014 | Lee |
| 8,695,201 B2 | 4/2014 | Morris |
| 8,720,016 B2 | 5/2014 | Beaulieu |
| 8,726,473 B2 | 5/2014 | Dole |
| 8,746,801 B2 | 6/2014 | Nakata |
| 8,773,846 B2 | 7/2014 | Wang |
| 8,811,004 B2 | 8/2014 | Liu |
| 8,826,499 B2 | 9/2014 | Tempesta |
| 8,833,771 B2 | 9/2014 | Lesnau |
| 8,833,832 B2 | 9/2014 | Whipps |
| 8,834,058 B2 | 9/2014 | Woicke |
| 8,905,812 B2 | 12/2014 | Pai-Chen |
| 8,910,350 B2 | 12/2014 | Poulakis |
| 9,003,891 B2 | 4/2015 | Frank |
| 9,039,318 B2 | 5/2015 | Mantei et al. |
| 9,050,690 B2 | 6/2015 | Hammer et al. |
| 9,061,403 B2 | 6/2015 | Colombo et al. |
| 9,061,715 B2 | 6/2015 | Morris |
| 9,062,991 B2 | 6/2015 | Kanagaraj |
| 9,067,625 B2 | 6/2015 | Morris |
| 9,194,413 B2 | 11/2015 | Christoph |
| 2001/0016986 A1 | 8/2001 | Bean |
| 2001/0030414 A1 | 10/2001 | Yokota |
| 2001/0045757 A1 | 11/2001 | Kanie et al. |
| 2002/0045086 A1 | 4/2002 | Tsuji et al. |
| 2002/0060275 A1 | 5/2002 | Polad |
| 2002/0092598 A1 | 7/2002 | Jones et al. |
| 2002/0130239 A1 | 9/2002 | Ishigami et al. |
| 2002/0136617 A1 | 9/2002 | Imahigashi |
| 2003/0007831 A1 | 1/2003 | Lian et al. |
| 2003/0059255 A1 | 3/2003 | Kirchen |
| 2003/0080131 A1 | 5/2003 | Fukuo |
| 2003/0082986 A1 | 5/2003 | Wiens et al. |
| 2003/0085618 A1 | 5/2003 | Rhodes |
| 2003/0087047 A1 | 5/2003 | Blauer |
| 2003/0108401 A1 | 6/2003 | Agha et al. |
| 2003/0180122 A1 | 9/2003 | Dobson |
| 2004/0028503 A1 | 2/2004 | Charles |
| 2004/0037637 A1 | 2/2004 | Lian et al. |
| 2004/0052574 A1 | 3/2004 | Grubb |
| 2004/0131896 A1 | 7/2004 | Blauer |
| 2004/0139678 A1 | 7/2004 | Pervan |
| 2004/0140651 A1 | 7/2004 | Yokota |
| 2004/0208728 A1 | 10/2004 | Fattori et al. |
| 2004/0262873 A1 | 12/2004 | Wolf et al. |
| 2005/0016116 A1 | 1/2005 | Scherff |
| 2005/0031946 A1 | 2/2005 | Kruger et al. |
| 2005/0042057 A1 | 2/2005 | Konig et al. |
| 2005/0054229 A1 | 3/2005 | Tsuya |
| 2005/0082449 A1 | 4/2005 | Kawaguchi et al. |
| 2005/0109489 A1 | 5/2005 | Kobayashi |
| 2005/0156409 A1 | 7/2005 | Yokota |
| 2005/0156410 A1 | 7/2005 | Yokota |
| 2005/0156416 A1 | 7/2005 | Yokota |
| 2005/0217088 A1 | 10/2005 | Lin |
| 2005/0244250 A1 | 11/2005 | Okada et al. |
| 2006/0082187 A1 | 4/2006 | Hernandez et al. |
| 2006/0092653 A1 | 5/2006 | Tachiiwa et al. |
| 2006/0102214 A1 | 5/2006 | Clemons |
| 2006/0110109 A1 | 5/2006 | Yi |
| 2006/0113755 A1 | 6/2006 | Yokota |
| 2006/0125286 A1 | 6/2006 | Horimatsu et al. |
| 2006/0141318 A1 | 6/2006 | MacKinnon et al. |
| 2006/0163902 A1 | 7/2006 | Engel |
| 2006/0170242 A1 | 8/2006 | Forrester et al. |
| 2006/0197356 A1 | 9/2006 | Catron et al. |
| 2006/0202449 A1 | 9/2006 | Yokota |
| 2006/0237995 A1 | 10/2006 | Huttenlocher |
| 2006/0249520 A1 | 11/2006 | DeMonte |
| 2006/0264076 A1 | 11/2006 | Chen |
| 2007/0034636 A1 | 2/2007 | Fukuo |
| 2007/0040411 A1 | 2/2007 | Dauvergne |
| 2007/0051572 A1 | 3/2007 | Beri |
| 2007/0113483 A1 | 5/2007 | Hernandez |
| 2007/0113485 A1 | 5/2007 | Hernandez |
| 2007/0126211 A1 | 6/2007 | Moerke et al. |
| 2007/0137018 A1 | 6/2007 | Aigner et al. |
| 2007/0144659 A1 | 6/2007 | De La Fuente |
| 2007/0205627 A1 | 9/2007 | Ishiguro |
| 2007/0227942 A1 | 10/2007 | Hirano |
| 2007/0251055 A1 | 11/2007 | Gerner |
| 2007/0258756 A1 | 11/2007 | Olshausen |
| 2007/0274777 A1 | 11/2007 | Winkler |
| 2007/0292205 A1 | 12/2007 | Duval |
| 2008/0014508 A1 | 1/2008 | Van Doren et al. |
| 2008/0018128 A1 | 1/2008 | Yamagiwa et al. |
| 2008/0073888 A1 | 3/2008 | Enriquez |
| 2008/0094447 A1 | 4/2008 | Drury et al. |
| 2008/0128346 A1 | 6/2008 | Bowers |
| 2008/0217796 A1 | 9/2008 | Van Bruggen et al. |
| 2008/0260488 A1 | 10/2008 | Scroggie et al. |
| 2009/0028506 A1 | 1/2009 | Yi et al. |
| 2009/0072591 A1 | 3/2009 | Baumgartner |
| 2009/0091156 A1 | 4/2009 | Neubrand |
| 2009/0093111 A1 | 4/2009 | Buchwalter et al. |
| 2009/0126168 A1 | 5/2009 | Kobe et al. |
| 2009/0134652 A1 | 5/2009 | Araki |
| 2009/0140112 A1 | 6/2009 | Carnevali |
| 2009/0141449 A1 | 6/2009 | Yeh et al. |
| 2009/0154303 A1 | 6/2009 | Vaucher et al. |
| 2009/0174207 A1 | 7/2009 | Lota |
| 2009/0211804 A1 | 8/2009 | Zhou et al. |
| 2009/0243172 A1 | 10/2009 | Ting et al. |
| 2009/0265896 A1 | 10/2009 | Beak |
| 2009/0309388 A1 | 12/2009 | Ellison |
| 2010/0000156 A1 | 1/2010 | Salhoff |
| 2010/0001539 A1 | 1/2010 | Kikuchi et al. |
| 2010/0021267 A1 | 1/2010 | Nitsche |
| 2010/0061045 A1 | 3/2010 | Chen |
| 2010/0102538 A1 | 4/2010 | Paxton et al. |
| 2010/0134128 A1 | 6/2010 | Hobbs |
| 2010/0147355 A1 | 6/2010 | Shimizu et al. |
| 2010/0162537 A1 | 7/2010 | Shiba |
| 2010/0232171 A1 | 9/2010 | Cannon et al. |
| 2010/0247034 A1 | 9/2010 | Yi et al. |
| 2010/0263417 A1 | 10/2010 | Schoenow |
| 2010/0270745 A1 | 10/2010 | Hurlbert et al. |
| 2010/0307848 A1 | 12/2010 | Hashimoto |
| 2011/0012378 A1 | 1/2011 | Ueno et al. |
| 2011/0036542 A1 | 2/2011 | Woicke |
| 2011/0076588 A1 | 3/2011 | Yamaura |
| 2011/0083392 A1 | 4/2011 | Timko |
| 2011/0103884 A1 | 5/2011 | Shiomoto et al. |
| 2011/0119875 A1 | 5/2011 | Iwasaki |
| 2011/0131918 A1 | 6/2011 | Glynn |
| 2011/0154645 A1 | 6/2011 | Morgan |
| 2011/0175376 A1 | 7/2011 | Whitens et al. |
| 2011/0183152 A1 | 7/2011 | Lanham |
| 2011/0191990 A1 | 8/2011 | Beaulieu |
| 2011/0191993 A1 | 8/2011 | Forrest |
| 2011/0207024 A1 | 8/2011 | Bogumil et al. |
| 2011/0239418 A1 | 10/2011 | Huang |
| 2011/0296764 A1 | 12/2011 | Sawatani et al. |
| 2011/0311332 A1 | 12/2011 | Ishman |
| 2012/0000291 A1 | 1/2012 | Christoph |
| 2012/0000409 A1 | 1/2012 | Railey |
| 2012/0020726 A1 | 1/2012 | Jan |
| 2012/0073094 A1 | 3/2012 | Bishop |
| 2012/0112489 A1 | 5/2012 | Okimoto |
| 2012/0115010 A1 | 5/2012 | Smith et al. |
| 2012/0187812 A1 | 7/2012 | Gerst |
| 2012/0240363 A1 | 9/2012 | Lee |
| 2012/0251226 A1 | 10/2012 | Liu et al. |
| 2012/0261951 A1 | 10/2012 | Mildner et al. |
| 2012/0301067 A1 | 11/2012 | Morgan |
| 2012/0311829 A1 | 12/2012 | Dickinson |
| 2012/0321379 A1 | 12/2012 | Wang et al. |
| 2012/0324795 A1 | 12/2012 | Krajenke et al. |
| 2013/0010413 A1 | 1/2013 | Kim |
| 2013/0017038 A1 | 1/2013 | Kestner et al. |
| 2013/0019454 A1 | 1/2013 | Colombo et al. |
| 2013/0019455 A1 | 1/2013 | Morris |
| 2013/0027852 A1 | 1/2013 | Wang |
| 2013/0055822 A1 | 3/2013 | Frank |

(56) References Cited

U.S. PATENT DOCUMENTS

| | | |
|---|---|---|
| 2013/0071181 A1 | 3/2013 | Herzinger et al. |
| 2013/0157015 A1 | 6/2013 | Morris |
| 2013/0212858 A1 | 8/2013 | Herzinger et al. |
| 2013/0269873 A1 | 10/2013 | Herzinger et al. |
| 2013/0287992 A1 | 10/2013 | Morris |
| 2014/0041176 A1 | 2/2014 | Morris |
| 2014/0132023 A1 | 5/2014 | Watanabe |
| 2014/0172112 A1 | 6/2014 | Marter |
| 2014/0175774 A1 | 6/2014 | Kansteiner |
| 2014/0199116 A1 | 7/2014 | Metten et al. |
| 2014/0202628 A1 | 7/2014 | Sreetharan et al. |
| 2014/0264206 A1 | 9/2014 | Morris |
| 2014/0360824 A1 | 12/2014 | Morris et al. |
| 2014/0360826 A1 | 12/2014 | Morris et al. |
| 2014/0366326 A1 | 12/2014 | Colombo et al. |
| 2014/0369742 A1 | 12/2014 | Morris et al. |
| 2014/0369743 A1 | 12/2014 | Morris et al. |
| 2015/0016864 A1 | 1/2015 | Morris et al. |
| 2015/0016918 A1 | 1/2015 | Colombo |
| 2015/0023724 A1 | 1/2015 | Morris et al. |
| 2015/0050068 A1 | 2/2015 | Morris et al. |
| 2015/0069779 A1 | 3/2015 | Morris et al. |
| 2015/0078805 A1 | 3/2015 | Morris et al. |
| 2015/0093177 A1 | 4/2015 | Morris |
| 2015/0098748 A1 | 4/2015 | Morris et al. |
| 2015/0135509 A1 | 5/2015 | Morris et al. |
| 2015/0167718 A1 | 6/2015 | Morris et al. |
| 2015/0232130 A1 | 8/2015 | Colombo |
| 2015/0291222 A1 | 10/2015 | Colombo et al. |
| 2015/0375798 A1 | 12/2015 | Morris et al. |

FOREIGN PATENT DOCUMENTS

| | | |
|---|---|---|
| CN | 1129162 A | 8/1996 |
| CN | 2285844 Y | 7/1998 |
| CN | 1205285 A | 1/1999 |
| CN | 1204744 A | 7/1999 |
| CN | 1328521 A | 12/2001 |
| CN | 1426872 A | 7/2003 |
| CN | 1496451 A | 5/2004 |
| CN | 2661972 Y | 12/2004 |
| CN | 2679409 Y | 2/2005 |
| CN | 1670986 A | 9/2005 |
| CN | 100573975 C | 9/2005 |
| CN | 1693721 A | 11/2005 |
| CN | 1771399 A | 5/2006 |
| CN | 1774580 A | 5/2006 |
| CN | 2872795 Y | 2/2007 |
| CN | 1933747 A | 3/2007 |
| CN | 2888807 Y | 4/2007 |
| CN | 1961157 A | 5/2007 |
| CN | 2915389 Y | 6/2007 |
| CN | 101005741 A | 7/2007 |
| CN | 200941716 Y | 8/2007 |
| CN | 101250964 A | 4/2008 |
| CN | 101390022 A | 3/2009 |
| CN | 201259846 Y | 6/2009 |
| CN | 201268336 Y | 7/2009 |
| CN | 201310827 Y | 9/2009 |
| CN | 201540513 U | 8/2010 |
| CN | 101821534 | 9/2010 |
| CN | 101930253 A | 12/2010 |
| CN | 201703439 U | 1/2011 |
| CN | 201737062 U | 2/2011 |
| CN | 201792722 U | 4/2011 |
| CN | 201818606 U | 5/2011 |
| CN | 201890285 U | 7/2011 |
| CN | 102144102 A | 8/2011 |
| CN | 102235402 A | 11/2011 |
| CN | 202024057 U | 11/2011 |
| CN | 202079532 U | 12/2011 |
| CN | 102313952 A | 1/2012 |
| CN | 202132326 U | 2/2012 |
| CN | 102540855 A | 7/2012 |
| CN | 102756633 | 10/2012 |
| CN | 102803753 A | 11/2012 |
| CN | 202561269 U | 11/2012 |
| CN | 102817892 A | 12/2012 |
| CN | 102869891 A | 1/2013 |
| CN | 102904128 A | 1/2013 |
| CN | 202686206 U | 1/2013 |
| CN | 102939022 A | 2/2013 |
| CN | 202764872 U | 3/2013 |
| CN | 202987018 U | 6/2013 |
| CN | 103201525 A | 7/2013 |
| CN | 103206596 A | 7/2013 |
| CN | 203189459 U | 9/2013 |
| CN | 203344856 U | 12/2013 |
| CN | 104100609 A | 10/2014 |
| CN | 203991175 U | 12/2014 |
| DE | 1220673 B | 7/1966 |
| DE | 2527023 A1 | 12/1976 |
| DE | 2736012 A1 | 2/1978 |
| DE | 2703897 A1 | 8/1978 |
| DE | 3704190 A1 | 12/1987 |
| DE | 3711696 A1 | 10/1988 |
| DE | 3805693 A1 | 2/1989 |
| DE | 3815927 | 11/1989 |
| DE | 9109276 U1 | 7/1991 |
| DE | 4002443 A1 | 8/1991 |
| DE | 4111245 A1 | 10/1991 |
| DE | 9201258 U1 | 3/1992 |
| DE | 29714892 U1 | 10/1997 |
| DE | 29800379 U1 | 5/1998 |
| DE | 69600357 T2 | 12/1998 |
| DE | 10202644 C1 | 6/2003 |
| DE | 10234253 B3 | 4/2004 |
| DE | 10333540 A1 | 2/2005 |
| DE | 60105817 T2 | 2/2006 |
| DE | 202007006175 U1 | 8/2007 |
| DE | 102008005618 A1 | 7/2009 |
| DE | 102008063920 A1 | 9/2009 |
| DE | 102008047464 A1 | 4/2010 |
| DE | 102010028323 A1 | 11/2011 |
| DE | 102011050003 A1 | 10/2012 |
| DE | 102012212101 B3 | 7/2013 |
| EP | 0118796 | 9/1984 |
| EP | 0616140 A2 | 9/1994 |
| EP | 1132263 A1 | 9/2001 |
| EP | 1243471 A2 | 9/2002 |
| EP | 1273766 A1 | 1/2003 |
| EP | 1293384 A2 | 3/2003 |
| EP | 1384536 A2 | 1/2004 |
| EP | 1388449 A1 | 2/2004 |
| EP | 1452745 A1 | 9/2004 |
| EP | 1550818 A1 | 7/2005 |
| EP | 2166235 A2 | 3/2010 |
| EP | 2450259 A1 | 5/2012 |
| EP | 2458454 A1 | 5/2012 |
| FR | 1369198 A | 8/1964 |
| FR | 2009941 A1 | 2/1970 |
| FR | 2750177 A2 | 12/1997 |
| FR | 2942749 A1 | 9/2010 |
| FR | 2958696 A1 | 10/2011 |
| GB | 155838 | 3/1922 |
| GB | 994891 | 6/1965 |
| GB | 2175626 A | 12/1986 |
| GB | 2281950 A | 3/1995 |
| GB | 2348924 A | 10/2000 |
| JP | H08200420 A | 8/1996 |
| JP | H0942233 A | 2/1997 |
| JP | 2000010514 A | 1/2000 |
| JP | 2001141154 A | 5/2001 |
| JP | 2001171554 A | 6/2001 |
| JP | 2003158387 A | 5/2003 |
| JP | 2003314515 A | 11/2003 |
| JP | 2005268004 | 9/2005 |
| JP | 2006205918 | 8/2006 |
| JP | 2008307938 A | 12/2008 |
| JP | 2009084844 | 4/2009 |
| JP | 2009187789 A | 8/2009 |
| JP | 2011085174 A | 4/2011 |
| JP | 2012060791 A | 3/2012 |
| JP | 2012112533 A | 6/2012 |

(56) References Cited

FOREIGN PATENT DOCUMENTS

| | | |
|---|---|---|
| KR | 20030000251 A1 | 1/2003 |
| KR | 100931019 B1 | 12/2009 |
| WO | 9602963 A1 | 2/1996 |
| WO | 9822739 A1 | 5/1998 |
| WO | 0055517 A2 | 3/2000 |
| WO | 0132454 A3 | 11/2001 |
| WO | 2004010011 | 1/2004 |
| WO | 2007126201 A1 | 11/2007 |
| WO | 2008140659 A1 | 11/2008 |
| WO | 2010105354 A1 | 9/2010 |
| WO | 2011025606 | 3/2011 |
| WO | 2013088447 A1 | 6/2013 |
| WO | 2013191622 A1 | 12/2013 |

OTHER PUBLICATIONS

U.S. Appl. No. 13/229,926, filed Sep. 12, 2011, titled "Using Elastic Averaging for Alignment of Battery Stack, Fuel Cell Stack, or Other Vehicle Assembly"—Inventors: MArk A. Smith, Ronald Daul, Xiang Zhao, David Okonski, Elmer Santos, Lane Lindstrom and Jeffrey A. Abell.

U.S. Appl. No. 13/330,718, filed Dec. 20, 2011, titled "Precisely Locating Components in an Infrared Welded Assembly"—Inventor: Steven E. Morris.

U.S. Appl. No. 13/459,118, filed Apr. 28, 2012, titled "Stiffened Multi-layer Compartment Door Assembly Utilizing Elastic Averaging"—Inventor: Steven E. Morris.

U.S. Appl. No. 13/570,959, filed Aug. 9, 2012, titled "Elastic Cantilever Beam Alignment System for Precisely Aligning Components"—Inventor: Steven E. Morris.

Awtar, S. & Sevincer, E. (Sep. 2006). Elastic Averaging in Flexure Mechanisms: A Multi-Beam Parallelogram Flexure Case-Study. From the Proceedings of IDETC/CIE 2006, Paper DETC2006-99752, American Society of Mechanical Engineers (ASME).

Balasubrarnaniam, M., Golaski, E., Son, S., Sriram, K. & Slocum, A. (Jul. 2002). An Anti Backlash Two-Part Shaft Coupling with Interlocking Elastically Averaged Teeth. Precision Engineering, vol. 26, No. 3, Elsevier Publishing.

DeVita, L., Plante, J. & Dubowsky, S. (Jun. 2007). The Design of High Precision Parallel Mechanisms using Binary Actuation and Elastic Averaging: With Application to MRI Cancer Treatment., 12th IFToMM World Congress, Besancon (France).

Gurung, S. (Dec. 2007). Passive Alignment of Micro-Fluidic Chips Using the Principle of Elastic Averaging. Thesis: Louisiana State University, Dept. of Mechanical Engineering.

U.S. Appl. No. 13/571,030, filed Aug. 9, 2012, entitled "Elastic Tube Alignment System for Precisely Locating an Emblem Lens to an Outer Bezel", inventors: Joel Colombo, Steven E. Morris, and Michael D. Richardson.

Willoughby, P. & Slocum, A. (2004). Precision Connector Assembly using Elastic Averaging. Massachusetts Institute of Technology (MIT), Cambridge, MA, American Society for Precision Engineering.

Cross-sectional view of a prior art infrared welded assembly of BMW, Munich, Germany. Believed on the market since about Jan. 1, 2010, 1 page.

Rojas, F.E., et al., "Kinematic Coupling for Precision Fixturing & Assembly" MIT Precision Engineering Research Group, Apr. 2013; 24 pgs.

Slocum, A.H., et al., "Kinematic and Elastically Averaged Joints: Connecting the Past, Present and Future" ntemational Symposium on Ultraprecision Engineering and Nanotechnology, Tokyo, Japan, Mar. 13, 2013; 4 pgs.

Jvilloughby, P., "Elastically Averaged Precision Alignment", Degree of Doctor of Philosophy in Mechanical Engineering Dissertation, Massachusetts Institute of Technology, 2005; 158 pgs.

\* cited by examiner

SEMI-CIRCULAR ALIGNMENT FEATURES OF AN ELASTIC AVERAGING ALIGNMENT SYSTEM

TECHNICAL FIELD

The present invention relates to location features for aligning of components during a mating operation. More particularly, the present invention relates to a plurality of mutually spaced apart semi-circularly shaped alignment features of a first component which are received by corresponding apertures formed in a second component during the mating therebetween, whereby precise alignment of the first and second components is provided by elastic averaging of the alignment features.

BACKGROUND OF THE INVENTION

Currently, components which are to be mated together in an assembly process are mutually located with respect to each other by 2-way and/or 4-way male alignment features, typically upstanding bosses, which are received into corresponding female alignment features, typically apertures in the form of holes or slots. There is a clearance between the male alignment features and their respective female alignment features which is predetermined to match anticipated geometrical variation tolerances of the male and female alignment features as a result of manufacturing (or fabrication). As a result of the clearance, there can occur significant positional variation as between the mated first and second components which contributes to the presence of undesirably large and varying gaps and otherwise poor fit therebetween.

By way of example, FIGS. 1 through 6 illustrate a prior art location modality for the aligning of two mating components as well as their mutual conjoining to each other with respect to an exemplar assembly 5.

With respect to alignment, a first component 10 has a plurality of male alignment features in the form of an upstanding star shaped lug 17, 27 connected to a first base 14 of the first component. A second component 18 has a second base 30. A plurality of female alignment features in the form of a round slot 19 and oblong slots having rounded ends 29 are formed in the second base, and disposed so that each male alignment feature 17, 27 is received by a respective female alignment feature 19, 29. In this regard, male alignment feature 17 and its round female alignment feature 19 provide a four-way alignment feature 15 of the first and second components with respect to each other; and, each of the other male alignment features 27 and their respective oblong female alignment feature 29 provide a two-way alignment feature 25 of the first and second components with respect to each other.

With respect to conjoining, the first component 10 has a plurality of male staking features in the form of an upstanding rectangular tab 12 connected to the first base 14 of the first component. At the first base 14, juxtaposed each tab 12, is a plurality of bosses 16, four of which being depicted at FIG. 3. The second component 18 at the second base 30 has inverted U-shape portions 32 which rest upon the bosses 16 when the first and second components are mated (see FIG. 4). A plurality of female staking features in the form of a rectangular slots 20 are formed in the second base, and disposed so that each slot receives a respective tab 12 when the first component is mated to the second component.

As best shown at FIG. 3, each tab 12 is loosely received into its respective slot 20, wherein the clearance (spacing or gap) 22 between the sides 24, 26 of the slot and the sides 28, 34 of the tab allow positional adjustment therebetween for accommodating geometric variances introduced during manufacture of the first and second components. For example, the clearance 22 between the tab 12 and the slot 20 may be 0.75 mm, whereby the error of mating of the first component to the second component may be up to about a 1.5 mm float. This float allows the male alignment features 17, 27 to be guidingly aligned by their respective female alignment features 19, 29.

In operation, as the first and second components are mated together, the initial contact therebetween occurs when the tabs pass into the respective slots, whereby the first and second components are kept in a general alignment to one another as they are mated. The clearance 22 allows the mating to proceed smoothly and effortlessly as the four-way alignment feature 15 and the two-way alignment features 25 guide the first and second components into alignment. Problematically, however, because of the clearance 22 provided at each of the male and female staking features 12, 20 and the clearance 35 provided at each of the four-way and two-way alignment features 15, 25, there is a float as between the first and second components 10, 18, and this float (or play), allows for the first component to be aligned relative to the second component generally, but not precisely. When the first and second components are affixed to each other (as for example by heat staking 45 (shown at FIG. 2) of the male staking features 12, by threaded fasteners, etc., any such misfit of alignment of the first component relative to the second component becomes manifest, and the visible joint between the two components may be irregular, have too large a gap, be unbalanced in appearance, etc.; in any event the misfit of alignment rendering the fit unacceptable for a Class A finish of the assembly 5.

Accordingly, what remains needed in the art is to somehow provide an alignment modality for the mating of components, wherein when mating is completed there is a lack of play as between the male and female alignment features and provided is a precise alignment, yet the aligned mating proceeds smoothly and effortlessly each time.

SUMMARY OF THE INVENTION

The present invention is a semi-circular male alignment feature elastic averaging alignment system utilizing a plurality of semi-circular male alignment features which interface by elastic averaging with a plurality of female alignment features, wherein semi-circular male alignment features of a first component are received during a mating process by respective female alignment features formed in a second component to provide an assembly having precise alignment of the first and second components, as well as stiffness therebetween, by elastic averaging of the male and female alignment features.

The semi-circular male alignment features are in the form of semi-circular studs vertically upstanding in perpendicular relation to a first base of a first component. Each semi-circular stud has a semi-circular cross-section characterized by a first face which is convexly shaped and a second face, opposed to the first face, which is characterized by a concavely shaped vertically disposed facial groove flanked on either side by left and right sidewalls which are planar truncated. Each semi-circular male alignment feature has a stud length which is much longer then a stud width. The semi-circular male alignment features have a stud height above the first base which preferably features tapering with increasing height from the first base, terminating at a generally rounded crest. Juxtaposed each male alignment feature is a plurality of bosses.

The female alignment features are apertures formed at a second base of a second component intended to be mated to the first component, wherein the second base is positioned, as for example by an inverted U-shape, so as to rest upon the bosses when the first and second components are fully mated. The shape of each aperture is preferably in the form of elongated slots, having an aperture length which is much longer than an aperture width.

The dimension of the female alignment features in relation to the semi-circular male alignment features is such that the aperture length exceeds the stud length, and the aperture width is less that the stud width adjacent the bosses. As such, as the first component is mated to the second component and the semi-circular studs are inserting into the apertures, the stud width will at first be less, then meet, and then exceed the aperture width, causing the second base to become elastically deformed, whereby the semi-circular studs become elastic averaged relative to the apertures.

In addition, the semi-circular studs may, on average, elastically deform by twisting. This stud twisting originates in situations in which each of the left and right sidewalls are not aligned exactly with a respectively facing aperture wall of the apertures during the mating process. In this regard, as mating completes, the semi-circular studs twist so that both the left and right sidewalls flatly and firmly abut their respectively facing aperture wall, while the twisting is upon the facial apex which firmly abuts its respectively facing aperture wall disposed opposite the first aperture wall. Preferably, the above mentioned elastic deformation of the second component occurs at the aperture wall abutting the first face of the semi-circular stud.

In accordance with the present invention, the elastic averaging provides a precise alignment of the components within a variance X', defined by $X'=X/\sqrt{N}$, where X is the average geometrical variance of the studs and the apertures, and N is the number thereof. Thus, the needed clearance for the male and female alignment features of the prior art is obviated by the present invention.

Accordingly, it is an object of the present invention to provide a plurality of semi-circular male alignment features in the form of vertically upstanding semi-circular studs disposed on a first component and a corresponding plurality of female alignment features in the form of apertures formed in a second component, wherein during mating of the first and second components, elastic averaging of the male and female alignment features provides precise alignment of the first and second components, as well as imparting stiffness therebetween.

This and additional objects, features and advantages of the present invention will become clearer from the following specification of a preferred embodiment.

DESCRIPTION OF THE PREFERRED EMBODIMENT

Figure 1:
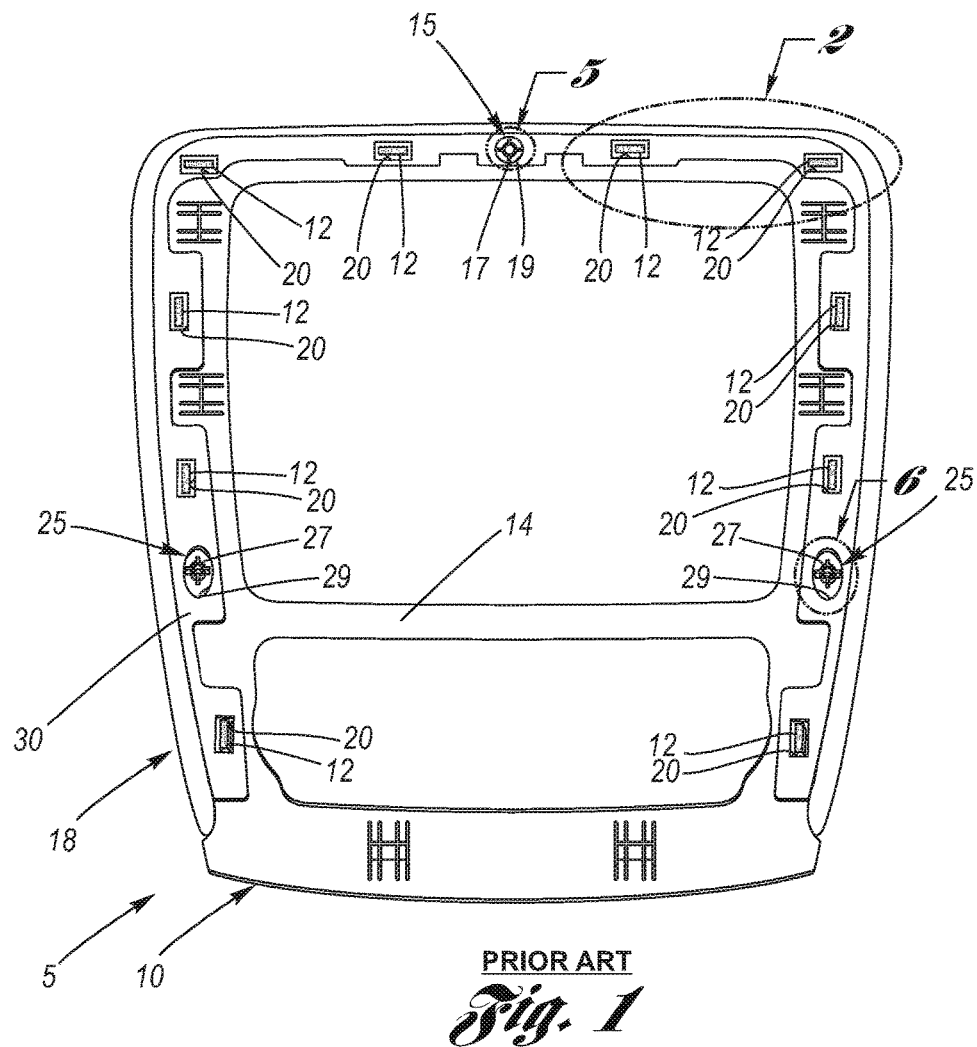
FIG. 1 is a perspective view of an assembly, wherein a first component is generally aligned to a second component, and wherein prior art alignment and conjoining modalities are utilized.
Figure 2:
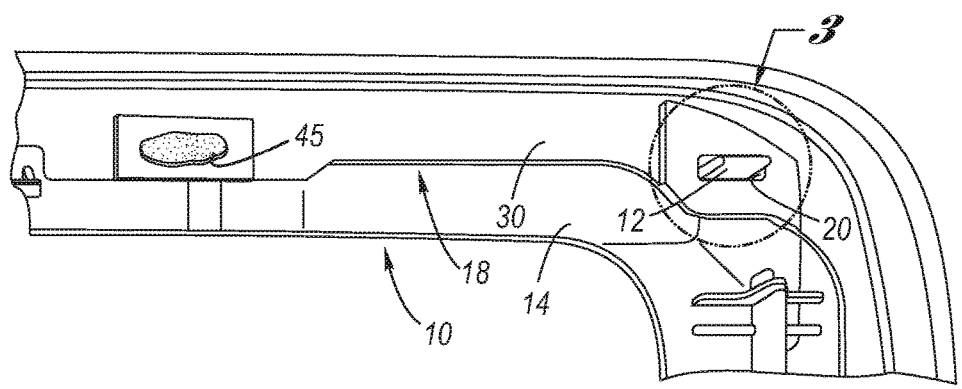
FIG. 2 is a detail, cut-away view, seen at demarcation 2 of FIG. 1.
Figure 3:
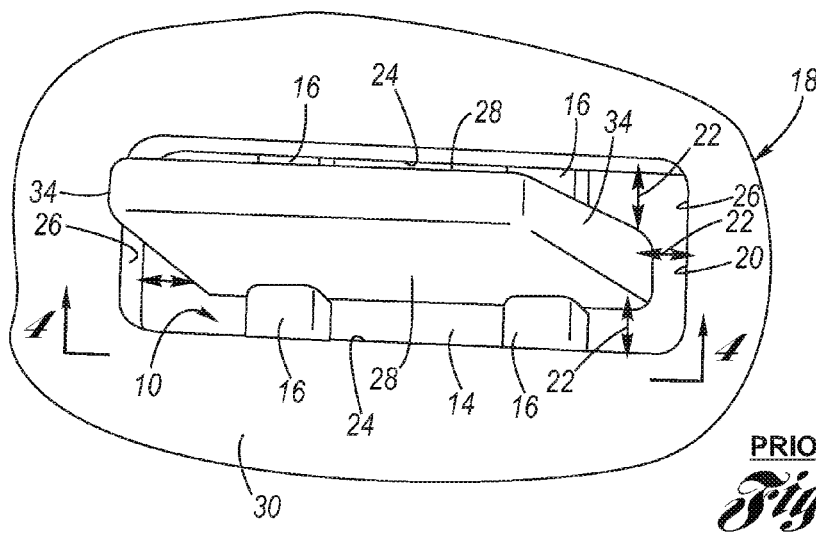
FIG. 3 is a detail, cut-away view, seen at demarcation 3 of FIG. 2.
Figure 4:
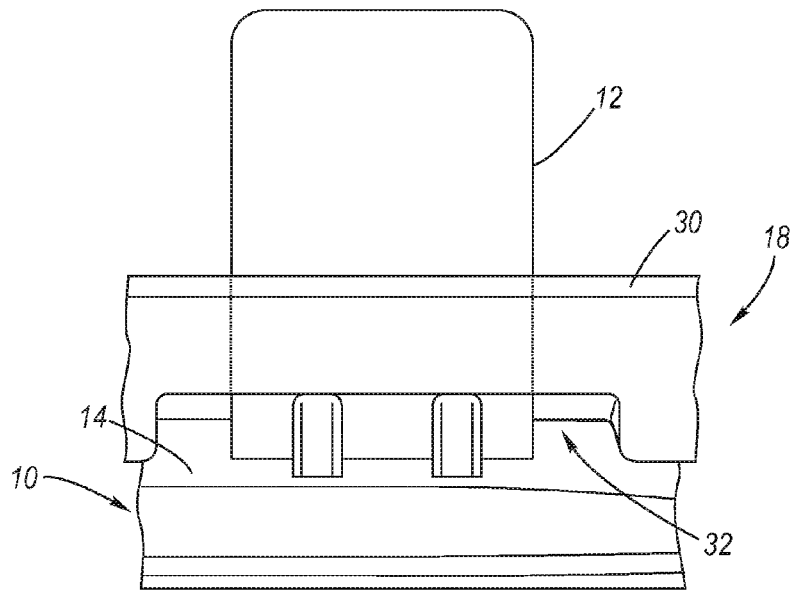
FIG. 4 is a detail, cut-away view, seen along line 4-4 of FIG. 2.
Figure 5:
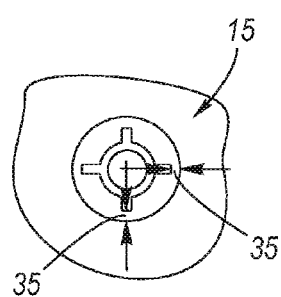
FIG. 5 is a detail, cut-away view, seen at demarcation 5 of FIG. 1.
Figure 6:
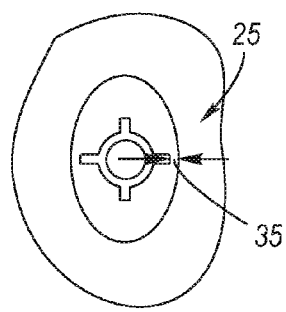
FIG. 6 is a detail, cut-away view, seen at demarcation 6 of FIG. 1.
Figure 7:
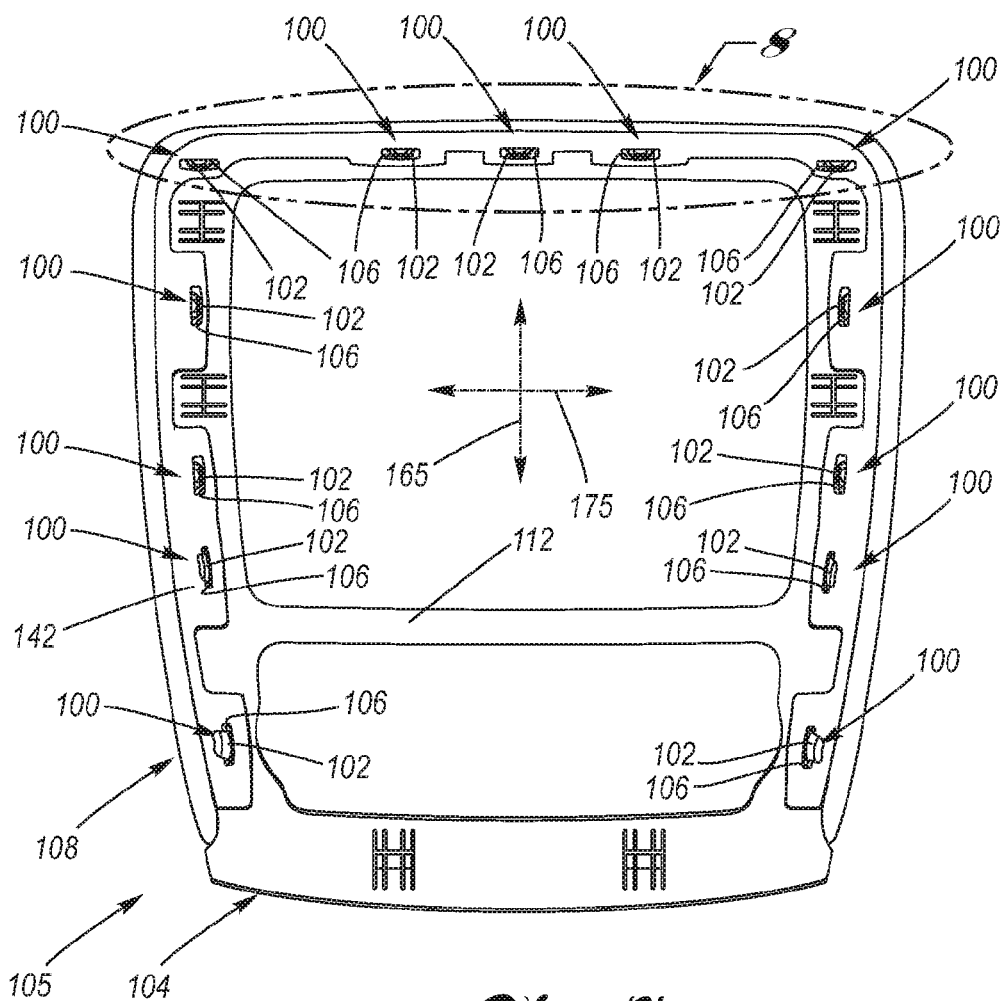
FIG. 7 is a perspective view of an assembly, wherein a first component is precisely aligned to a second component via elastic averaging of semi-circular male alignment features with respect to female alignment features in accordance with the present invention.
Figure 8:
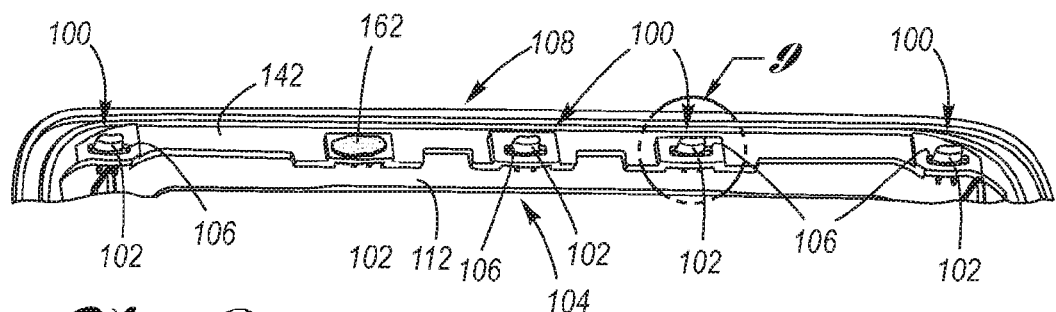
FIG. 8 is a perspective view, seen at demarcation 8 of FIG. 7.
Figure 9:
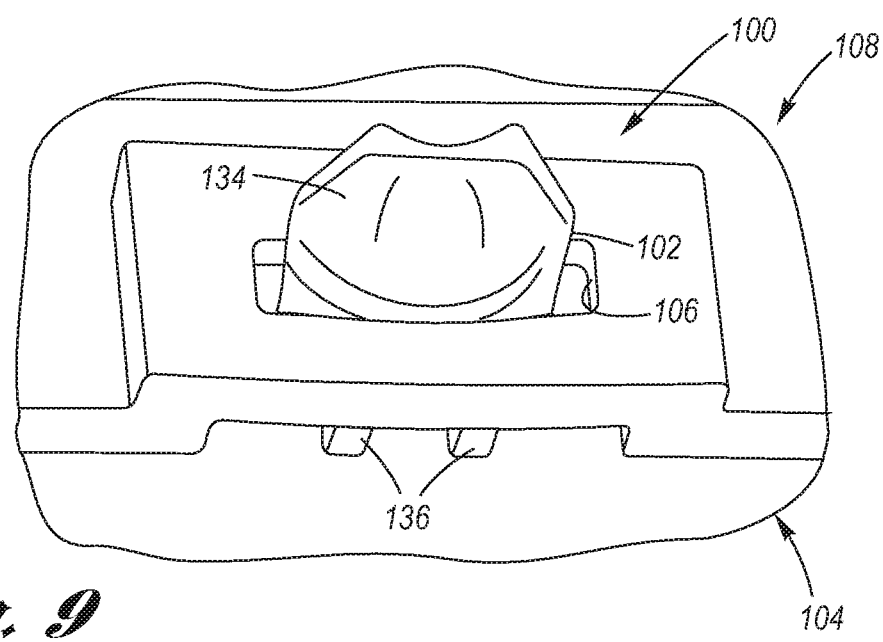
FIG. 9 is a detail, cut-away view, seen at demarcation 9 of FIG. 8.

Referring now to the Drawings, FIGS. 7 through 17 depict an example of the structure and function of the semi-circular male alignment feature elastic averaging alignment system 100 according to the present invention, wherein an assembly 105 is shown merely by way of example at FIG. 7. In this regard, semi-circular male alignment features 102 are upstandingly disposed at a first component 104 and are interfaced by elastic averaging with respect to female alignment features 106 disposed at second component 108 when the first and second components are mated to each other to form an assembly, such as the assembly 105.

The semi-circular male alignment features 102 are in the form of semi-circular studs 110 which are attached to a first base 112 of the first component 104 in vertically upstanding (i.e., perpendicular) relation thereto. Each semi-circular stud 110 has a semi-circular cross-section characterized by a first face 114 which is convexly shaped forming a vertically disposed facial apex 116. Each semi-circular stud 110 further has a second face 118, disposed in opposition to the first face 114, which is characterized by a concavely shaped vertically disposed facial groove 120 that is flanked on either side by left and right sidewalls 122, 124 which are planar truncated along a vertical truncation plane 126 (see FIGS. 11 and 12).

Figure 10:
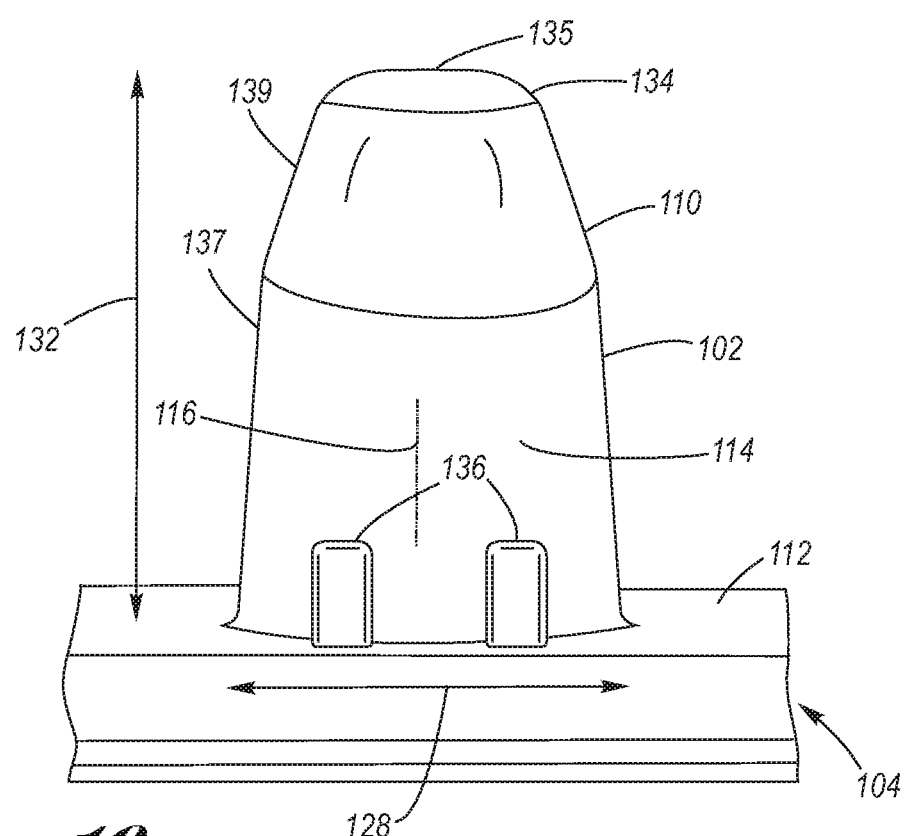
FIG. 10 is a plan view of a first face of a semi-circular male alignment feature according to the present invention.
Figure 11:
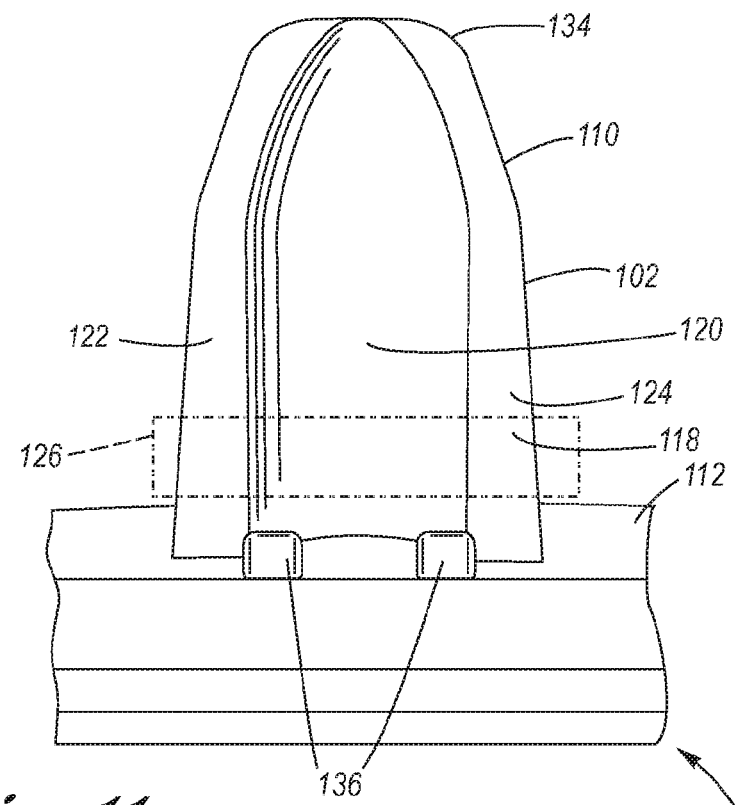
FIG. 11 is a plan view of a second face of the semi-circular male alignment feature according to the present invention.
Figure 12:
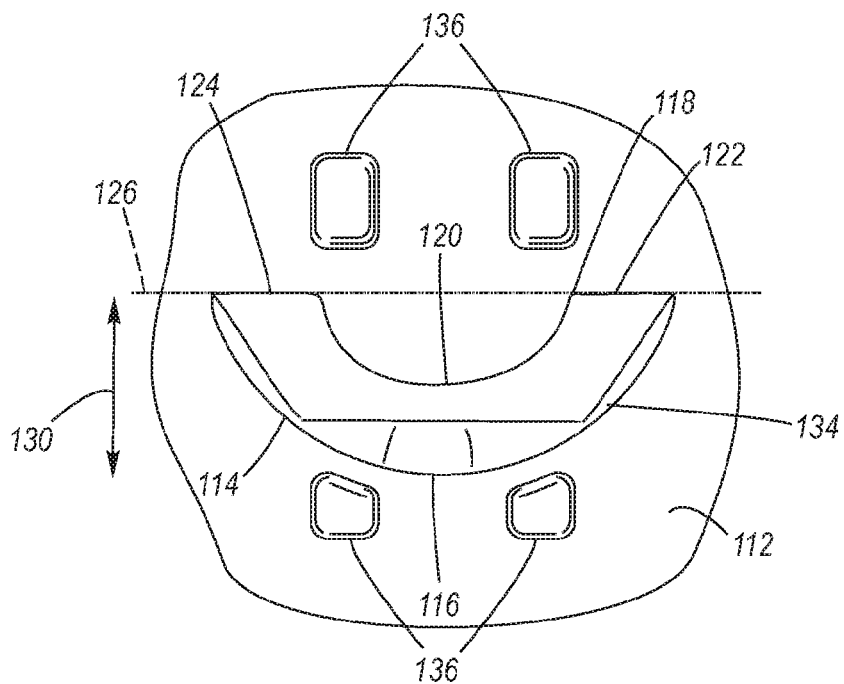
FIG. 12 is a top plan view of the semi-circular male alignment feature according to the present invention.

Each semi-circular male alignment feature 102 has a stud length 128, as determined at the first base 112, that is measured parallel to the truncation plane 126 (see FIG. 10). The stud length 128 is much longer than a stud width 130 (see FIG. 12), wherein the stud width, as determined between the first and second faces 114, 118, is measured with respect to either of the left and right sidewalls 122, 124 of the second face and the facial apex 116 of the first face. The semi-circular male alignment features 102 have a stud height 132 above the first base 112 which provides for initial alignment of the first and second components 104, 108 (see FIG. 10). The alignment stud is preferably tapering with increasing height from the first base, terminating at a generally rounded crest 134 which preferably is characterized by a generally flattened top 135, wherein the tapering is preferably characterized by a lower taper 137 and an upper taper 139, wherein the upper taper is more acutely angled than is the lower taper.

Juxtaposed each semi-circular male alignment feature 102 is a plurality of bosses 136 connected with the first base 112. By way of exemplification, four bosses 136 are shown, two at each of the first and second faces 114, 118, respectively.

Figure 13:
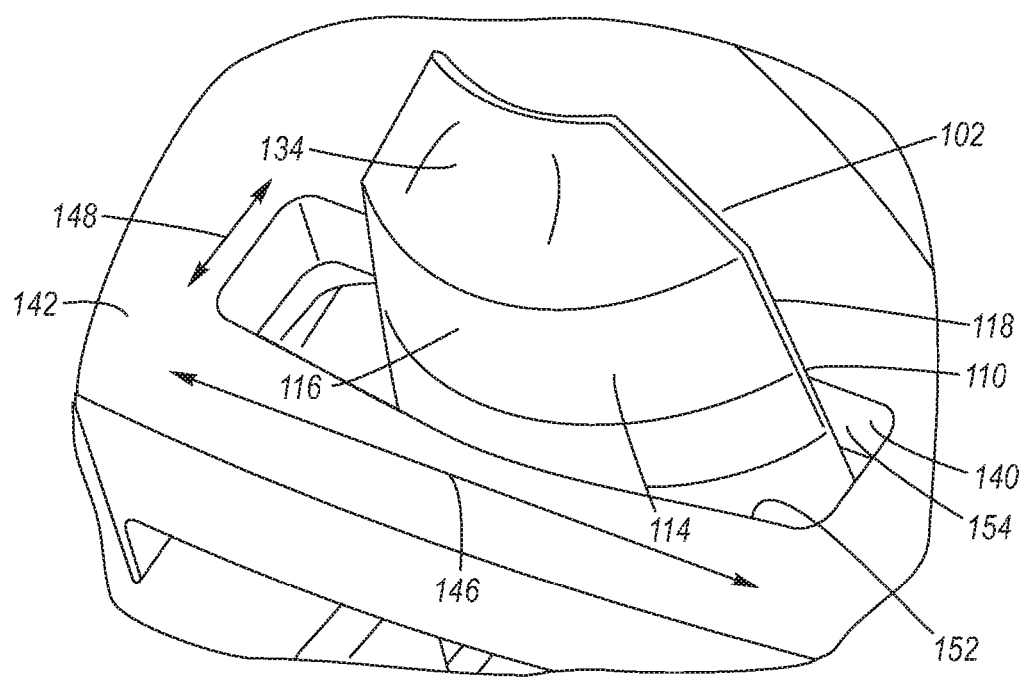
FIG. 13 is a perspective view of the semi-circular male alignment feature fully inserted into its respective female alignment feature in accordance with the present invention.

The female alignment features 106 are apertures 140 formed in a second base 142 of the second component 108 (see FIG. 13). The second base 142 is positioned, as for example by an inverted U-shape 144, so as to rest upon the bosses 136 (see FIG. 14) when the first and second components 104, 108 are fully mated with each other. The shape of each aperture 140 is preferably in the form of elongated slots (as shown), but may be otherwise, such as oblong holes with rounded ends, having an aperture length 146 which is much larger than an aperture width 148.

Figure 14:
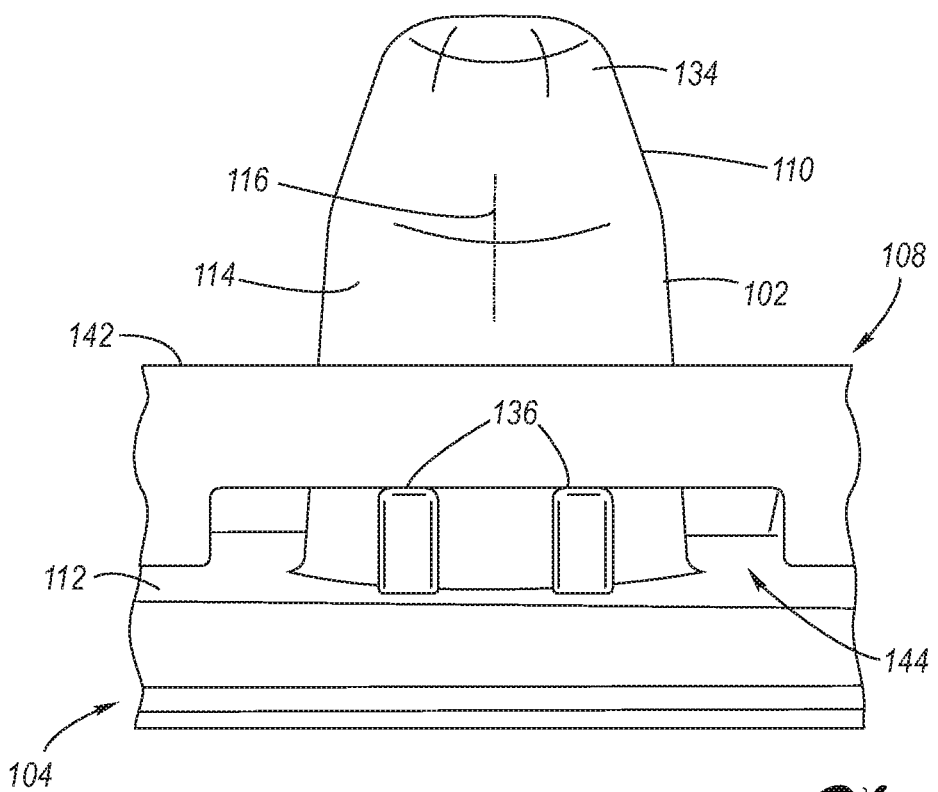
FIG. 14 is a plan view of the semi-circular male alignment feature fully inserted into its respective female alignment feature, seen from the first side of the semi-circular male alignment feature.
Figure 15:
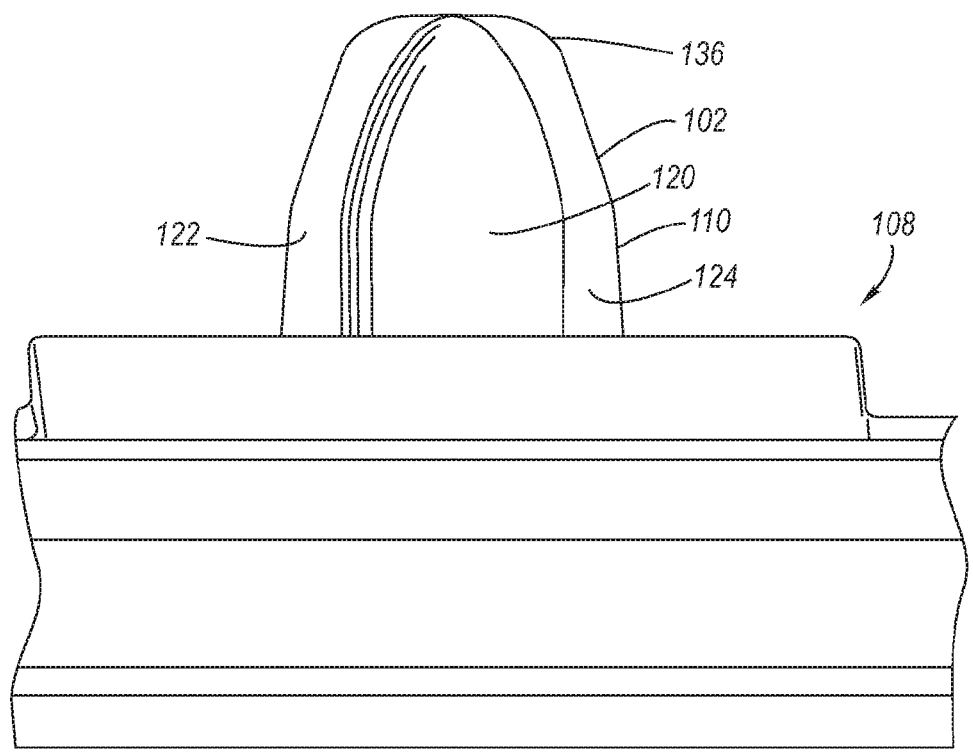
FIG. 15 is a plan view of the semi-circular male alignment feature fully inserted into its respective female alignment feature, seen from the second side of the semi-circular male alignment feature.
Figure 16:
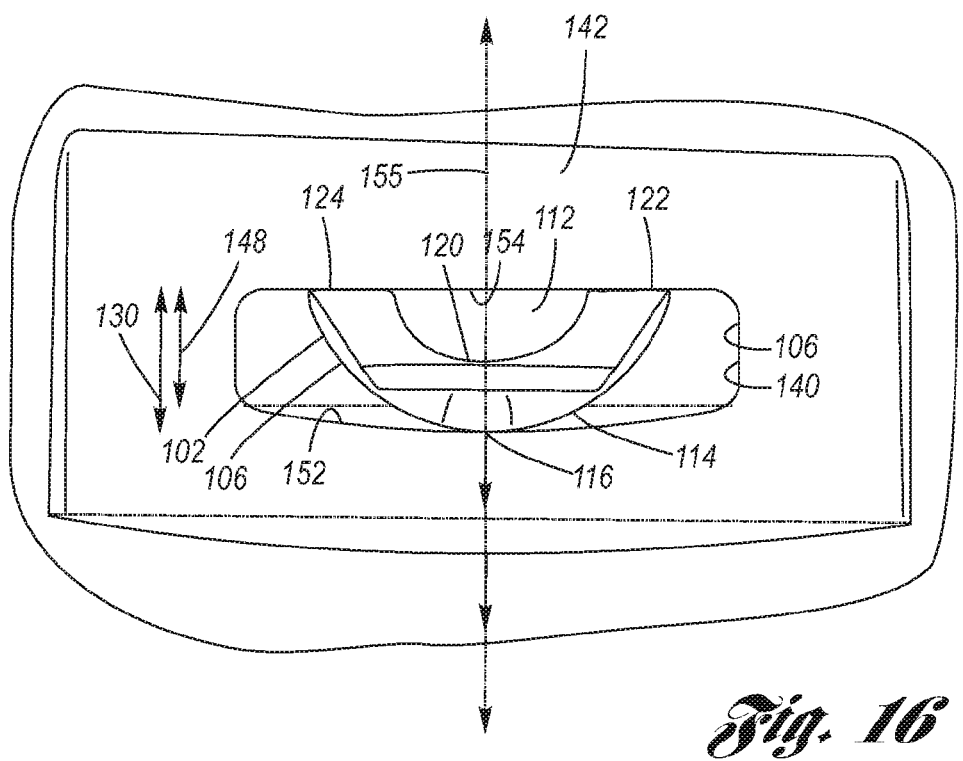
FIG. 16 is a top plan view of the semi-circular male alignment feature fully inserted into its respective female alignment feature.
Figure 17:
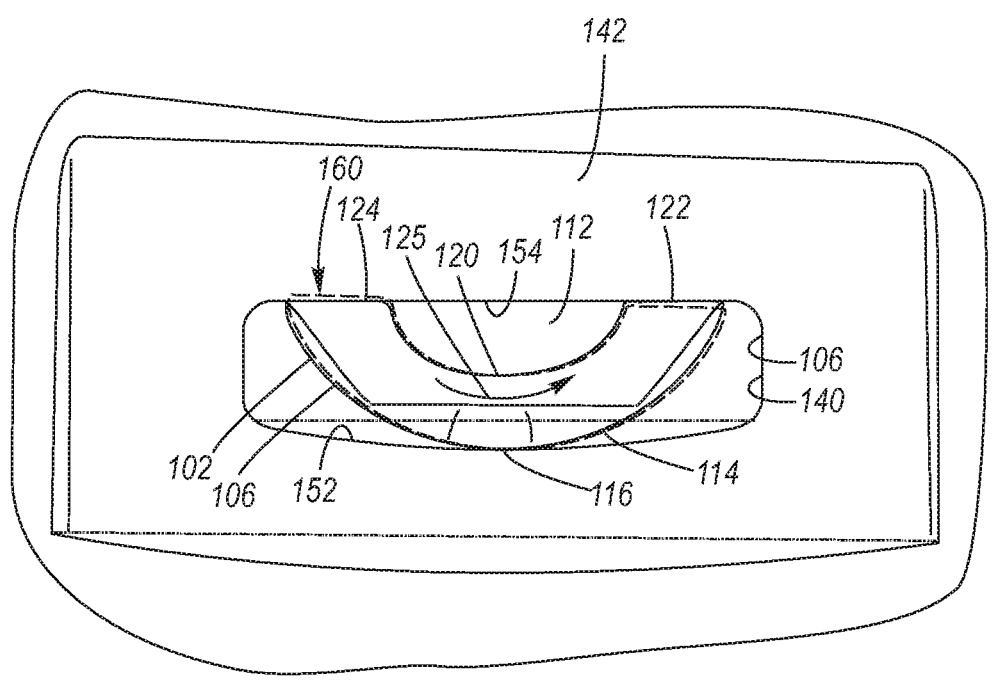
FIG. 17 is a top plan view of the semi-circular male alignment feature fully inserted into its respective female alignment feature, demonstrating elastic twisting of a the semi-circular male alignment feature.

The dimension of the female alignment features 106 in relation to the semi-circular male alignment features 102 is such that an interfering fit therebetween is provided, wherein the aperture length 146 exceeds the stud length 128, and the aperture width 148 is less than the stud width 130 adjacent the bosses 136 (see FIG. 14). Further the stud height 132 is much larger than the thickness (inclusive of the inverted U-shape 144) 150 of the second base 142. As such, as the first component 104 is mated to the second component 108 and the semi-circular studs 110 insert into the apertures 140, the stud width 130 will at first be less, then will become equal to (due to the aforementioned tapering thereof), and then exceed the aperture width 148 as the first base 112 nears the bosses 136, causing the second base 142 to become elastically deformed (see FIG. 16), whereby the semi-circular studs 110 become elastic averaged with respect to the apertures 140.

The afore described elastic averaging occurs as follows. As mating of the first and second components 104, 108 progresses, a point is reached where the first face 114 of a semi-circular stud 110 comes into abutment with a first aperture wall 152 of its respective aperture 140, while at the same moment the second face 118 comes into abutment with a second aperture wall 154. More particularly, the facial apex 116 abuts the first aperture wall 152 and the left and right sidewalls 122, 124 abut the second aperture wall 154. As mating progresses to its end result when the first base 112 rests upon the bosses 136, a state of elastic compression is applied at the interface of the semi-circular male alignment features and the female alignment features, whereby an interfering fit is provided by the semi-circular stud 110 to the second base 142 relative to the first and second aperture walls 152, 154. This is elastically averaged over all the semi-circular studs and their respective apertures. Preferably, in this regard, each semi-circular stud 110 as well as the second base 142 are structurally rigid sufficiently that elastic deformation occurs in the second base only at the first aperture wall 152 by pressure applied thereto by the facial apex 116.

If during mating of the first and second components 104, 108 the first and/or second sidewalls 122, 124 are not are not exactly aligned with the second aperture wall 154 due to geometrical variation, then as mating progresses to completion, the one or more semi-circular studs 110 which are misaligned will elastically twist so that both the left and right sidewalls become flatly and firmly abutted with the second aperture wall. During this twisting, there is a pivoting of the facial apex 116 upon the first aperture wall 152. This elastic twisting is facilitated by the bosses 136, which raise the twist torque 160 above the first base. By way of exemplification, see comparison of dashed and solid lines of the semicircular male alignment feature in FIG. 17, wherein the twisting is in the direction of arrow 125.

After the mating operation, the first and second components are then affixed to each other, as for example by heat staking 162 of the male alignment features (see FIG. 8), by threaded fasteners, etc.

A preferred plastic material for the second component 108 in which the apertures 140 are disposed is one having elastic properties so as to deform without fracture, as for example acrylonitrile butadiene styrene (ABS).

Thus, it is seen that the semi-circular male alignment features 102 in cooperation with the female alignment features 106 collectively provide a two-way alignment feature, wherein the alignment axis 155 (see FIG. 16) is perpendicular to the first and second aperture walls 152, 154, passing centrally through the male alignment features in bisecting relation to the first and second sidewalls 122, 124 and the facial apex 116. In this regard, it is seen by the exemplar assembly 105 depicted at FIG. 7 that the various orientations of the male alignment features (along with their respective female alignment features) provides multi-directional alignment for the first component relative to the second component such that the fit therebetween is precise due to elastic averaging of all the male and female alignment features.

In accordance with the present invention, the elastic averaging provides a precise alignment of the components within a variance X', defined by $X'=X/\sqrt{N}$, where X is the average geometrical variance of the studs and the apertures, and N is the number thereof Thus, the needed clearance for the male and female alignment features of the prior art is obviated by the present invention. In the exemplar assembly 105 of FIG. 7, N equals five across the top row (shown at FIG. 8), whereby the alignment axis therefore is along an ordinate 165, and for the left and right side rows N totals eight, whereby the alignment axis therefore is along an abscissa 175.

The semi-circular male alignment features 102 my be used in conjunction with elastic tube male alignment features in accordance with U.S. patent application Ser. No. 13/187,675 to Steven E. Morris, filed on Jul. 21, 2011, the disclosure of which is hereby incorporated herein by reference. In this regard by way of example with respect to FIG. 7, the five semi-circular male alignment features 102 remain as shown at the top row, and elastic tube male alignment features are disposed at the left and rights sides of the assembly in substitution for the four semi-circular male alignment features depicted at each of the left and right sides of the assembly.

It will be understood from the foregoing description that there are several notable aspects of the present invention.

The present invention: 1) eliminates the geometrical variation associated with the clearances needed for a 2-way and 4-way locating schemes of the prior art; 2) accommodates geometric variation by elastically averaging as between the semi-circular male alignment features and the female alignment features; 3) eliminates the float of components as is present in the prior art; 4) provides an over constrained condition at the interfaces between the semi-circular male alignment features and the female alignment features, whereby stiffening of the assembly of the mated first and second components is provided and rattle therebetween is eliminated; 5) provides a precise location of the first and second components; 6) the elastic averaging (which is calculable using standard beam calculation techniques) provides a predictable uniformity and consistency in the fit as between the first and second components when mated; 7) provides further elastic averaging by twisting of the semi-circular male alignment features relative to the female alignment features; and 8) serves the dual purpose of both an alignment feature and a staking feature (if desired).

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A semi-circular male alignment feature elastic averaging alignment system, comprising:
   a first component having a first base;
   a second component having a second base, said second base having a base thickness;
   a plurality of semi-circular male alignment features disposed at said first base in upstanding relation thereto; and
   a plurality of female alignment features formed in said second base, wherein each semi-circular male alignment feature is received by a respective female alignment feature when said first component is mated to said second component;
   wherein when each said semi-circular male alignment feature is received into the respective female alignment feature of the second base during mating of said first component with respect to said second component, elastic deformation occurs at an interface between each semi-circular male alignment feature and the respective female alignment feature of the second base, wherein said elastic deformation is responsive to each said semi-circular male alignment feature being interferingly received by the respective female alignment feature;
   wherein said elastic deformation is elastically averaged over said plurality of semi-circular male alignment features such that said first component is precisely located relative to said second component; and
   wherein each said semi-circular male alignment feature comprises a semi-circular stud having a semi-circular cross-section comprising:
   a first face having a convex shape forming a facial apex;
   a second face having a facial groove flanked by a left sidewall and by a right sidewall; and
   a stud height which is greater than said base thickness;
   wherein said semi-circular stud tapers from said first base and terminates distally therefrom in a generally rounded crest.

2. The semi-circular male alignment feature elastic averaging alignment system of claim 1, wherein each said semi-circular stud has a stud width adjacent said first base between said first and second faces; wherein the respective female alignment feature has an aperture width; and wherein said elastic deformation is responsive to said stud width exceeding said aperture width.

3. The semi-circular male alignment feature elastic averaging alignment system of claim 2, wherein said elastic deformation occurs in said second base adjoining said first face.

4. The semi-circular male alignment feature elastic averaging alignment system of claim 3, wherein each said left and right sidewall is planar truncated.

5. The semi-circular male alignment feature elastic averaging alignment system of claim 4, wherein said elastic averaging further occurs by twisting of any said semi-circular stud in which said left and right sidewalls are misaligned with respect to the respective female alignment feature prior to the mating of said first and second components.

6. The semi-circular male alignment feature elastic averaging alignment system of claim 5, wherein said elastic deformation provides a stiffened assembly of said first and second components when said first and second components are mutually mated to each other.

7. A semi-circular male alignment feature elastic averaging alignment system, comprising:
   a first component having a first base;
   a second component having a second base, said second base having a base thickness;
   a plurality of semi-circular male alignment features disposed at said first base in upstanding relation thereto; and
   a plurality of female alignment features formed in said second base, wherein each semi-circular male alignment feature is received by a respective female alignment feature when said first component is mated to said second component;
   wherein when each said semi-circular male alignment feature is received into the respective female alignment feature during mating of said first component with respect to said second component, elastic deformation occurs at an interface between each semi-circular male alignment feature and the respective said female alignment feature, wherein said elastic deformation is responsive to each said semi-circular male alignment feature being interferingly received by the respective female alignment feature;
   wherein each said semi-circular male alignment feature comprises a semi-circular stud having a semi-circular cross-section comprising:
   a first face having a convex shape forming a facial apex;
   a second face having a facial groove flanked by a left sidewall and by a right sidewall; and
   a stud height which is greater than said base thickness;
   wherein said semi-circular stud tapers from said first base and terminates distally therefrom in a generally rounded crest;
   wherein each said semi-circular stud has a stud width adjacent said first base between said first and second faces; wherein the respective female alignment feature has an aperture width; and wherein said elastic deformation is responsive to said stud width exceeding said aperture width;
   wherein said elastic deformation further comprises twisting of any said semi-circular stud in which said left and right sidewalls are misaligned with respect to the respective female alignment feature prior to the mating of said first and second components; and wherein said elastic deformation is elastically averaged over said plurality of semi-circular male alignment features such that said first component is precisely located relative to said second component.

\* \* \* \* \*